United States Patent
Schley

[11] 3,867,205
[45] Feb. 18, 1975

[54] REFRACTORY METAL HOT-JUNCTION THERMOCOUPLE

[75] Inventor: Robert Schley, Orly, France

[73] Assignee: Commissariat A L'Energie Atomique, Paris, France

[22] Filed: Apr. 16, 1973

[21] Appl. No.: 351,270

[30] Foreign Application Priority Data
Apr. 20, 1972  France ............................ 72.13896

[52] U.S. Cl. ............... 136/232, 136/202, 136/230, 136/233
[51] Int. Cl. ............................................. H01r 1/04
[58] Field of Search .......... 136/202, 236, 230, 232, 136/233, 234

[56] References Cited
UNITED STATES PATENTS

| | | | |
|---|---|---|---|
| 2,992,402 | 7/1961 | Thomas | 136/230 X |
| 3,048,641 | 4/1962 | Erlebacher | 136/232 |
| 3,232,794 | 2/1966 | Korton | 136/233 |
| 3,441,451 | 4/1969 | Salgado | 136/232 |
| 3,502,510 | 3/1970 | Zysk et al. | 136/236 X |
| 3,607,447 | 9/1971 | Davis et al. | 136/233 |
| 3,625,775 | 12/1971 | MacKenzie et al. | 136/233 |
| 3,649,368 | 3/1972 | Sine | 136/232 |

OTHER PUBLICATIONS
Stadnyk et al., Teplofizika Vysokikh Temperatur, 2 (4) 634–647 (1964) (translation) 136/236

Primary Examiner—Benjamin R. Padgett
Assistant Examiner—E. A. Miller
Attorney, Agent, or Firm—Cameron, Kerkam, Sutton, Stowell & Stowell

[57] ABSTRACT

The invention relates to a refractory metal hot junction thermocouple comprising conducting wires insulated by ceramic beads protected by a metal sheath. The hot junction between the wires is obtained by crimping a noble-metal crimping element on the twisted hot junction which is then secured in the metal sheath. The crimping element is preferably made of niobium or rhenium.

6 Claims, 6 Drawing Figures

REFRACTORY METAL HOT-JUNCTION THERMOCOUPLE

This invention relates to thermocouples.

As is known, a thermocouple comprises a weld or junction between two wires made of different metals and placed at the measuring point (the "hot junction") and two welds or "cold junctions" disposed at the other end of the wires, in a medium at a reference temperature.

An e.m.f. occurs at the two junctions, the difference therein being proportional to the temperature difference between the points in question (Seebeck effect).

In conventional thermocouples the hot junction (e.g., iron-constantan, copper-constantan, chromium-alumel, platinum and platinum-containing rhodium, etc.) is produced by simple autogenous welding of two wires, or by arc welding, or by a capacitor discharge, etc. The metal welds are sufficiently ductile to ensure that, under good conditions, the thermocouples withstand the mechanical and thermal stresses to which they are subjected during operation.

The situation is different for thermocouples made of refractory metals, more particularly tungsten wires containing 5% or 26% rhenium, which are welded at a temperature approaching 3,000°C, and for which crystallisation effects are such that the weld has practically no mechanical strength.

Attempts have been made to weld tungsten-rhenium thermocouples in the manner described, at a point at the end of the two wires, but the wires cannot be manipulated and, when they are sheathed, the more fragile wire breaks at the slightest thermal stress.

Attempts have also been made to obviate stresses by inserting a smaller-diameter wire between the thermocouple elements. In another method, the wires are given mechanical strength by twisting, the welds merely acting as an electric contact. The first method can be used only when the two wires are kept stationary with respect to one another, which is certainly not the case in bare couples, and in any case a junction of this kind cannot be obtained with sheathed thermocouples. The second method gives good results if one can be certain that the junction will not be subjected to any stress. It has been found that when sheathed thermocouples are mounted vertically, which is nearly always the case, the ceramic beads expand less than the sheath and consequently stress the junction and break a thermocouple element at the place where it emerges from an insulating bead.

The invention sets out to obviate these disadvantages and improve the method of manufacturing junctions. To this end the invention provides a hot-junction thermocouple comprising conducting wires insulated by ceramic beads protected by a metal sheath, characterised in that a noble-metal crimping element is crimped on the twisted hot junction and secured in the metal sheath.

According to another feature of the invention, the crimping element is secured in a sleeve disposed in the sheath. If the thermocouple needs to comprise an earthed point, one end of the crimping element is welded to the metal sheath.

The most suitable substances for crimping are niobium and rhenium, refractory metals having a melting point higher than the temperature at which the thermocouple is used. They do not form a eutectic with the conducting wires below the operating temperature, and are highly ductile so that they can be crimped when cold and are also sufficiently ductile when hot.

The following description refers to embodiments described with reference to the accompanying drawings, in which.

Figure 1:
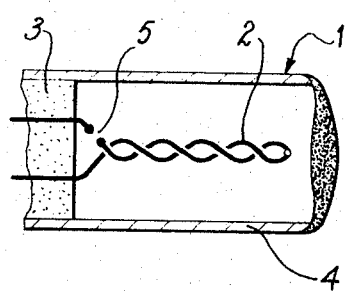
FIG. 1 illustrates the general case of a prior art thermocouple illustrating the normal manner in which a hot junction breaks.

FIG. 1 shows a sheathed thermocouple 1 used in a vertical position and having a hot junction 2. Ceramic beads 3 expand less than metal sheath 4 and consequently slide in it and stress the hot junction 2, which frequently breaks at point 5.

Figure 2:
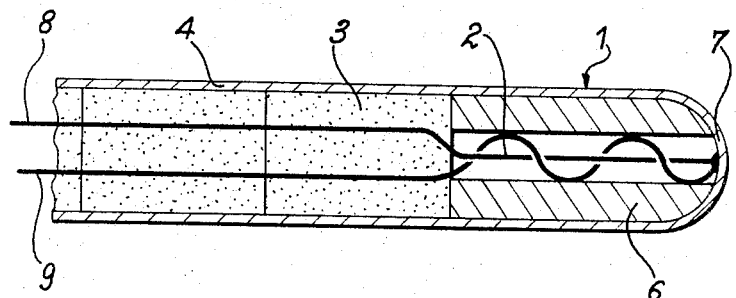
FIG. 2 is a diagrammatic longitudinal section through a thermocouple according to the invention.

In FIG. 2, a thermocouple 1 according to the invention comprises a twisted hot junction 2 of two wires, one being straight and the other coiled about and spaced from the straight wire and joined at their ends on which a refractory-metal crimping element 6 is mounted on the coiled wire and serves as a spacer between the last bead 3 and a welded end 7 closing the metal sheath 4. Consequently, the hot junction 2 is subjected to any stresses resulting from differences between the expansion of beads 3 and sheath 4. If the thermocouple is used when the sheath is earthed (FIG. 2), the weld between element 6 and end 7 satisfies the last-mentioned condition perfectly.

Figure 3:
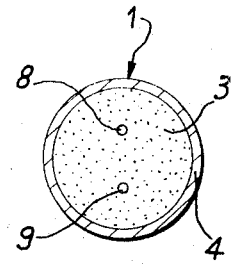
FIG. 3 is a cross-section through FIG. 2.

FIG. 3 is a cross-section of thermocouple 1 across beads 3, and illustrates the conventional arrangement of two conductors 8 and 9.

Figure 4:
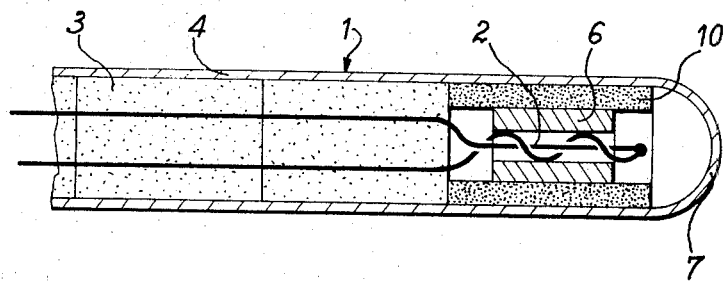
FIG. 4 is a diagrammatic longitudinal section through another embodiment of the invention.
Figure 5:
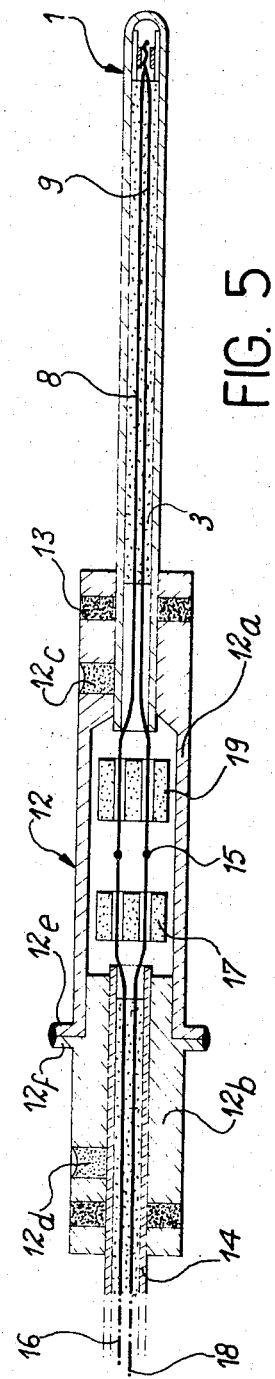
FIG. 5 is a general view of a thermocouple mounted on a rod.

FIG. 4 shows another embodiment of the invention, in which thermocouple 1 should be insulated from earth 4. In this case, the hot junction 2 is crimped with a crimping element 6 having a reduced cross-section and sliding in a ceramic sleeve 10 adapted to the inner diameter of metal sheath 4. Sleeve 10 serves as a spacer between beads 3 and welded end 7, thus ensuring that the thermocouple is sealing-tight. Consequently, crimping element 6 and sleeve 10 relieve the hot junction 2 from all stress and the sleeve itself provides the required insulation. In the present example, the metals used for manufacturing the crimping element 6 are niobium and rhenium. These metals have the advantage of having a melting-point above the temperature at which the thermocouple is used and of not forming a eutectic with the conducting wires below this temperature. They are highly ductile, which facilitates cold crimping, and are sufficiently ductile when hot. Niobium can be used at temperatures up to 2,000°C and rhenium can be used up to 3,000°C.

In order to obviate the need for a very long sheath 4 made of a noble refractory metal, according to another feature of the invention the sheath is connected to an intermediate casing 12 secured to a sheath 14 made e.g., of stainless steel.

Sheaths 4, 14 are welded to half-elements 12a, 12b respectively of casing 12 at corresponding brazing points 12c and 12d. Reservoirs such as 13 filled with an

TABLE I

|  | $Al_2O_3$ | $ThO_2$ | $ZrO_2$ | BeO | MgO | $HfO_2$ |
|---|---|---|---|---|---|---|
| W |  |  |  |  |  |  |
| W Re 5% | 2000°C | 2300°C | 2100°C | 2100°C | 2000°C | 2300°C |
| W Re 26% |  |  |  |  |  |  |
| Re | 1800 | 2300 |  |  |  | 2300 |
| Ta | 1900 | 1900 | 1600 | 1600 | 1800 |  | anti-wetting product prevent, in known manner, any creeping of the brazing at high temperatures.

The junction 15 between the thermocouples wires 8, 9 and between the measurement-compensating wires 15, 16 is in casing 12. Ceramic beads 17, 19 insulate and bear the wires and the junction thereof.

The half-elements 12a, 12b are welded together by their respective shoulders 12e, 12f. After the welding, casing 12 is sealing-tight and pressurised under helium.

Table I, by way of example, shows the temperatures at which a reaction begins between some refractory metals which can be used for the wires, the crimping components or sheaths, and the refractory oxides forming the insulating components.

Table II, by way of illustration, shows the chemical behaviour of refractory metals in air, hydrogen, nitrogen, carbon, carbon monoxide and carbon dioxide.

In the Table:
$T_1$ = temperature at which the reaction begins
$T_2$ = temperature at which oxidation increases
$T_3$ = temperature of maximum absorption
$P$ = product formed.

Table III, by way of example, shows the possibilities for thermocouples according to the invention, depending on the ambient medium and on the compatibility between refractory metals and refactory oxides. In the example, the thermocouple wires 8, 9 are made of WRe 5% and WRe 25%.

Figure 6:
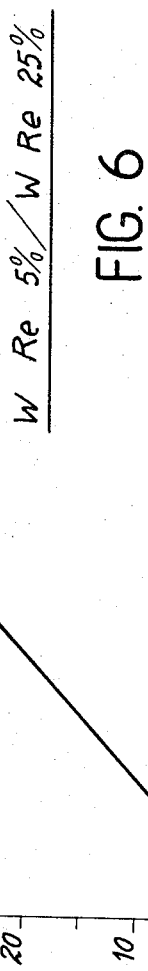
FIG. 6 shows a calibration curve for thermocouple wires.

FIG. 6 is a calibration curve which, for temperatures up to 2,250°C, shows the e.m.f. in mV at the terminals of thermocouples made of WRe 5% and WRe 26% wires.

Table IV, by way of illustration, shows the capture cross-sections of a few refractory metals, expressed in barn/at in dependence on a neutron velocity of 2,200 m/s.

Table V, by way of illustration, shows the thermal neutron capture cross-sections of a few refractory oxides. The cross-sections are expressed in barns.

TABLE II

|  |  | W | Re | Ta |
|---|---|---|---|---|
| O2 Air | $T_1$ | 400° C | 300° C | 200° C |
|  | $T_2$ | 700 | 600 | 500 |
|  | P | $WO_3$ | $Re_2O_7$ | $Ta_2O_5$ |
|  | $T_3$ |  |  | 400 |
| $H_2$ | P | No Action | No Action | Ta H +1 01 101 |
| N2 | $T_1$ | 2.500° C | No Action | 1.100° C |
|  | P | $WN_2$ | 2.000°C | $TaN_2$ |
| C | $T_1$ | 800°C |  | 1,200° C |
| CO $CO_2$ | P | $W_2C$ WC | No Action | Ta C |

TABLE III

| Combination of thermo-couple wire insulating material and sheath | W $Al_2O_3$ Nb | W $Al_2O_3$ Ta | W BeO Ta | W BeO M. or W BeO Mo Re | W$ThO_2$ Re or W$ThO_2$ W Re |
|---|---|---|---|---|---|
| Ambient medium |  |  |  |  |  |
| $UO_2$ (He vacuum) | 1700° C | 1900° C | 1600° C | 1900° C | 2300° C |
| C (He vacuum $CO_2 N_2$) | 1200° | 1200° | 1200° | 1900° | 2300° |
| $O_2$ | 500° | 500° | 500° | 600° | 600° |
| $CO_2$ | 1200° | 1200° | 1200° | 1900° | 2300° |
| $N_2$ | 600° | 1100° | 1100° | 1900° | 2300° |
| $H_2$ | 360° | 400° | 400° | 1900° | 2300° |
| Neutrons | yes | no | no | yes | yes |

TABLE IV

| ELEMENTS | Rh | Ta | W | Re | Ir | Pt |
|---|---|---|---|---|---|---|
| CAPTURE CROSS-SECTION (barn/at) | 149,0 | 21 21,3 | 19,2 | 84 86 | 440,0 | 8,8 |

TABLE V

REFRACTORY OXIDES

| $Al_2O_3$ | BeO | MgO | $ThO_2$ | $Z_2O_3$ |
|---|---|---|---|---|
| THERMAL NEUTRON CAPTURE CROSS-SECTION (barns) ||||  |
| 0,01 | 0,0007 | 0,0033 | 0,132 | 0,01 |

I claim:

1. A hot-junction thermocouple comprising two conducting wires insulated by ceramic beads and surrounded and protected by a hermetically sealed gas filled metal sheath, one wire being straight and the other wire coiled about and spaced from the straight wire, the wires being connected to their ends and a noble-metal crimping element on the twisted hot junction isolated in the metal sheath.

2. A thermocouple according to claim 1, including a refractory sleeve isolating the crimping element in the sheath.

3. A thermocouple according to claim 1, the crimping element being niobium.

4. A thermocouple according to claim 1, the crimping element being rhenium.

5. A thermocouple according to claim 1, including an intermediate casing secured to the metal sheath protecting the junction between the wires of the hot junction and the compensating wires.

6. A thermocouple according to claim 1, the gas being helium.

* * * * *